US011554387B2

(12) United States Patent
Jin et al.

(10) Patent No.: US 11,554,387 B2
(45) Date of Patent: Jan. 17, 2023

(54) RINGDOWN CONTROLLED DOWNHOLE TRANSDUCER

(71) Applicant: Halliburton Energy Services, Inc., Houston, TX (US)

(72) Inventors: Jing Jin, Singapore (SG); Yao Ge, Singapore (SG); Ruijia Wang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 155 days.

(21) Appl. No.: 16/438,167

(22) Filed: Jun. 11, 2019

(65) Prior Publication Data
US 2020/0391247 A1 Dec. 17, 2020

(51) Int. Cl.
E21B 47/14 (2006.01)
G01V 1/52 (2006.01)
B06B 1/06 (2006.01)
E21B 47/008 (2012.01)

(52) U.S. Cl.
CPC ............ *B06B 1/0681* (2013.01); *B06B 1/067* (2013.01); *E21B 47/008* (2020.05); *E21B 47/14* (2013.01)

(58) Field of Classification Search
None
See application file for complete search history.

(56) References Cited

U.S. PATENT DOCUMENTS

| | | | |
|---|---|---|---|
| 4,928,264 A | 5/1990 | Kahn | |
| 5,486,734 A | 1/1996 | Seyed-Bolorforosh | |
| 8,264,126 B2 | 9/2012 | Toda et al. | |
| 8,570,837 B2 | 10/2013 | Toda et al. | |
| 8,689,639 B2 | 4/2014 | Berger | |
| 9,050,628 B2 * | 6/2015 | Lautzenhiser | ...... H01L 41/1132 |
| 9,154,057 B2 | 10/2015 | Akiyama et al. | |
| 9,473,106 B2 | 10/2016 | Wathen et al. | |
| 2005/0002276 A1 | 1/2005 | Yogeswaren et al. | |
| 2007/0113654 A1 | 5/2007 | Carim et al. | |
| 2009/0230969 A1 | 9/2009 | Hall et al. | |

(Continued)

FOREIGN PATENT DOCUMENTS

| | | |
|---|---|---|
| EP | 0015886 A1 | 9/1980 |
| JP | 05180811 A | 7/1993 |

OTHER PUBLICATIONS

PCT Application Serial No. PCT/US2019/036610, International Search Report, dated Mar. 5, 2020, 3 pages.

(Continued)

*Primary Examiner* — Curtis A Kuntz
*Assistant Examiner* — Jerold B Murphy
(74) *Attorney, Agent, or Firm* — DeLizio, Peacock, Lewin & Guerra

(57) ABSTRACT

An apparatus and system for deploying an acoustic sensor are disclosed. In some embodiments, an acoustic sensor includes a transducer comprising a piezoelectric material layer having a front side from which the transducer is configured to transmit acoustic sensing signals and an opposing back side. A backing material layer comprising an acoustic damping material is coupled at a front side to the back side of the piezoelectric material layer. An acoustic reflector such as may comprise a cavity containing gaseous or liquid fluid is disposed between the front side and a back side of the backing material layer.

18 Claims, 5 Drawing Sheets

(56) References Cited

U.S. PATENT DOCUMENTS

| | | |
|---|---|---|
| 2011/0178407 A1 | 7/2011 | Lu et al. |
| 2013/0241356 A1* | 9/2013 | Kim ..................... G10K 9/122 310/336 |
| 2014/0373619 A1 | 12/2014 | Slay et al. |
| 2016/0296975 A1* | 10/2016 | Lukacs ................ B06B 1/0685 |
| 2017/0299751 A1* | 10/2017 | Chang .................. E21B 47/007 |
| 2019/0302063 A1* | 10/2019 | Hadimioglu ........... G01N 29/28 |

OTHER PUBLICATIONS

PCT Application Serial No. PCT/US2019/036610, International Written Opinion, dated Mar. 5, 2020, 8 pages.
PCT Application Serial No. PCT/US2019/050173, International Search Report, dated Jun. 8, 2020, 4 pages.
PCT Application Serial No. PCT/US2019/050173, International Written Opinion, dated Jun. 8, 2020, 6 pages.

* cited by examiner

RINGDOWN CONTROLLED DOWNHOLE TRANSDUCER

TECHNICAL FIELD

The disclosure generally relates to the field of acoustic transducers and in particular to design and utilization of piezoelectric acoustic sensors.

BACKGROUND

In oilfield services operations, acoustic sensors that employ piezoelectric transducers are used for various measurement and imaging operations. Such operations may be utilized for immersed mud caliper measurements, formation properties identification, etc. Acoustic signals such as ultrasonic signals generated by piezoelectric transducers may be substantially attenuated when propagating through drilling mud or other downhole wellbore substances. Attenuation of the returning reflected and/or refracted acoustic signals in some high density downhole fluid environments may reduce the accuracy and consistency of piezoelectric transducer data due to reduced signal-to-noise ratio (SNR). Self-induced acoustic interference further degrades acoustic sensor performance by further reducing the SNR.

BRIEF DESCRIPTION OF THE DRAWINGS

Embodiments of the disclosure may be better understood by referencing the accompanying drawings.

DESCRIPTION OF EMBODIMENTS

Figure 1:
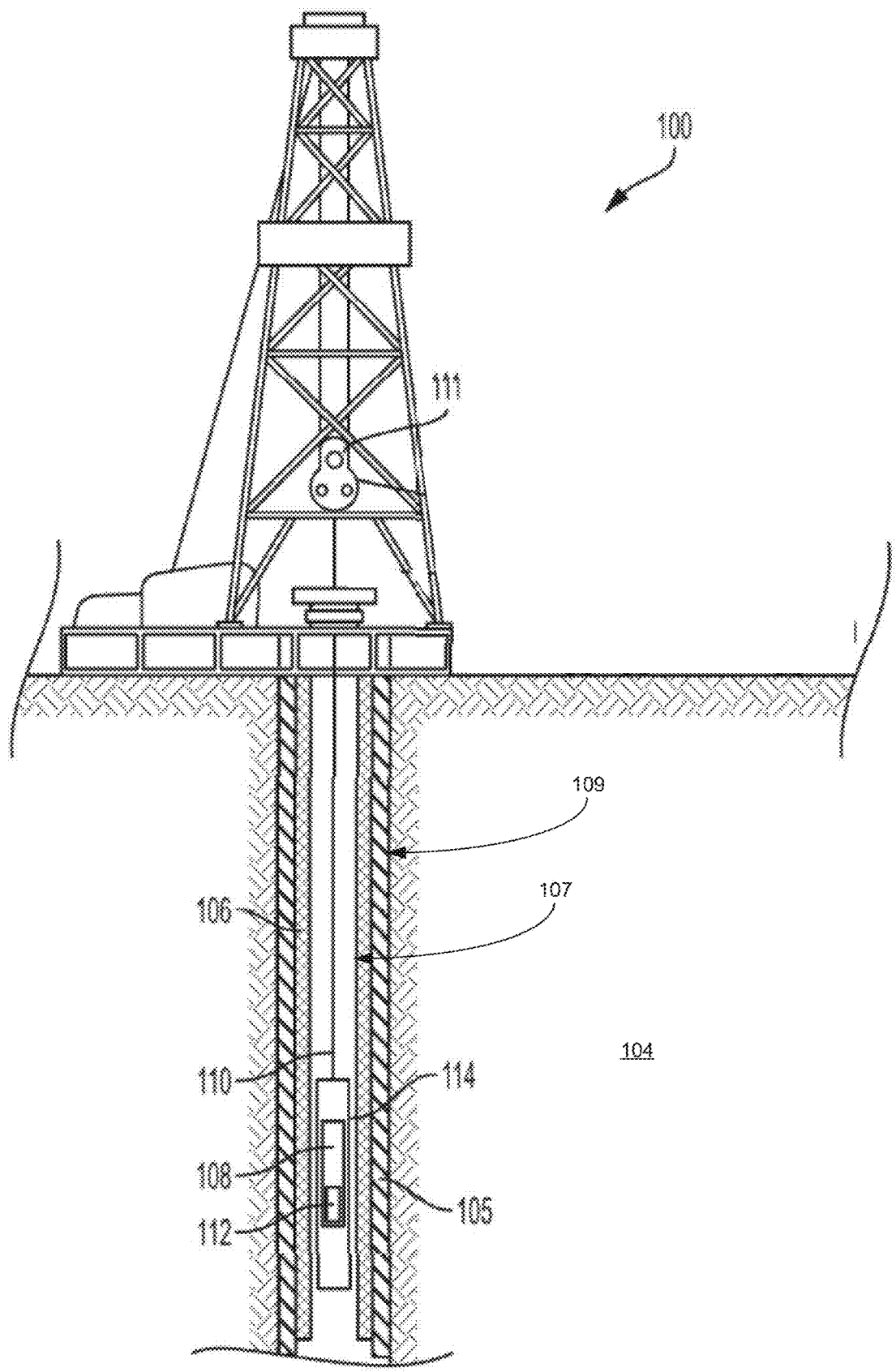
FIG. 1 depicts a partial cross-section view of a well system that includes a downhole measurement system comprising an acoustic sensor in accordance with some embodiments.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Embodiments address issues relating to obtaining consistently accurate acoustic signal information from downhole acoustic sensors that utilize piezoelectric transducers. In some embodiments, a logging tool comprises a tool housing within which an acoustic sensor and sensor controller are deployed within a wellbore. The acoustic sensor is configured to periodically generate acoustic signals, such as ultrasonic pulses, that propagate into and through a wellbore in which the logging tool is positioned. The acoustic sensor comprises a piezoelectric transducer having a radially outward facing front side from which the acoustic signals propagate into the wellbore. During an acoustic measurement cycle, a piezoelectric transducer may experience reverberation shorting following generation of the outgoing acoustic signals. Such reverberations, sometimes referred to as ringdown, may result in interference and resultant reduced SNR during an echo response phase of a measurement cycle.

To address ringdown, the acoustic sensor includes a backing material layer coupled to a back side of the piezoelectric transducer. The backing material layer comprises acoustic attenuating/damping material formed to include a front side that is coupled to the back side of the piezoelectric transducer and a back side from which acoustic waves may reflect. The acoustic sensor is further configured to include an acoustic reflection boundary within the backing material layer between the front side and the back side of the backing material layer. The acoustic reflection boundary is positioned and otherwise configured to reduce or prevent self-induced acoustic interference within the acoustic sensor. In some embodiments, the acoustic reflection boundary is formed by an acoustic impedance discontinuity or mismatch at the boundary of an internal surface of the backing material layer and an acoustic reflector that may comprise a gas or liquid fluid layer. For instance, the backing material layer may comprise a solid material such as tungsten rubber with the acoustic reflector comprising a cavity within the backing material layer containing a gaseous or liquid fluid. The acoustic reflector may be contoured and positioned to address reverberations that may reduce SNR during an echo response phase of an acoustic measurement cycle. For example, the acoustic reflector may comprise an embedded component having outer edges that do not extend as broadly in terms, for example, of planar profile as the back surface of the piezoelectric transducer. For example, the acoustic reflector may form a planar reflective surface area that is between 20% and 80% of the total surface area of the back side of the piezoelectric transducer.

To provide echo response window interference removal, the acoustic reflection boundary is disposed at an offset distance with respect to the back side of the piezoelectric transducer. The offset distance is based on the relative timing of an echo response phase within a measurement cycle of the acoustic sensor. Acoustic waves propagating from the back side of the transducer through the backing material layer are at least partially reflected by the acoustic reflection boundary back toward the transducer such that acoustic energy is further absorbed and acoustic reverberation occurs outside the echo response phase/window.

The distance by which the acoustic reflection boundary is axially offset (reflector axial offset) is based, at least in part, on the acoustic transmission properties (e.g., acoustic impedance) of the backing material in combination with the echo response phase. The echo response phase is relative in terms of start and stop time to an excitation pulse transmission time. The acoustic reflector position, including possible lateral as well as axial offset, may be determined during a sensor design and/or calibration process such that a substantial portion of the acoustic energy of an initially generated pulse that propagates into the backing material layer is dissipated prior to or otherwise outside of the sensor echo response period.

Example Illustrations

FIG. 1 depicts a partial cross-section view of a well system 100 that includes downhole acoustic measurement components in accordance with some embodiments. Well system 100 includes a borehole 109 extending through various earth strata in a sub-terrain region 104. An annular casing 106 extends from the surface into subterranean formation 104. Casing 106 provides a wellbore 107 through which formation fluids, such as production fluids produced from hydrocarbon bearing formations within subterranean region 104, travel from downhole positions to the surface. Casing 106 may be attached to the walls of the wellbore via cement encasement provided by a cement sheath 105 formed between casing 106 and the substantially annular wall of borehole 109.

Well system 100 further includes at least one logging tool 114 that may be configured as a wellbore evaluation tool and/or a formation evaluation tool. Logging tool 114 is coupled to a conveyance component 110 that, depending on the application, may comprise a wireline, slickline, coiled tubing, or drill string deployed into wellbore 107. Conveyance component 110 may be extended into wellbore 107 using, for example, a guide 111 or winch. Logging tool 114 includes a sensor system 108 that is configured to transmit acoustic signals within wellbore 107 and consequently induce corresponding acoustic echo responses from the various layers formed by casing 106, cement sheath 105, and formation region 104. To this end, sensor system 108 includes an acoustic sensor 112 that is configured to generate, transmit, receive, and process acoustic wave signals such as in the form of ultrasonic waves.

As explained in further detail with reference to FIGS. 2A and 2B, acoustic sensor 112 may include a piezoelectric transducer configured to generate and transmit acoustic signals, such as periodic ultrasonic excitation pulses, based on electrical signal input. The transducer component within acoustic sensor 112 has a front side from which acoustic waves are transmitted outwardly into wellbore 107 and an opposing back side. Acoustic sensor 112 may further include a cover layer attached to a front side of the transducer that faces radially outward toward borehole 109 to protect the transducer from the fluid environment within wellbore 107. In accordance with the disclosed embodiments, acoustic sensor 112 further includes a backing material layer attached to the back side of the transducer. The backing material comprises acoustic damping material such as ultrasonic attenuation material that is compositionally and structurally configured to attenuate acoustic waves emitted from the back side of the transducer to reduce interference caused by ringdown reverberation.

Sensor system 108 includes electronics configured to provide electrical excitation pulse signals converted by the piezoelectric transducer(s) of acoustic sensor 112 into acoustic signals. In some examples, the acoustic signals may comprise ultrasonic pressure waves transmitted at frequencies of 20 kHz and above. The external acoustic medium within wellbore 107 may include liquid and/or gaseous fluids such as oil, water, drilling fluid/mud, etc. The acoustic waves propagate from a front side of the transducer(s) within acoustic sensor 112 and propagate through wellbore, casing, and/or formation material media including fluid and solid materials and reflect or refract from one or more features within and/or external to wellbore 107. For example, the acoustic waves may reflect from material surfaces and inter-material boundaries within wellbore 107, casing 106, cement sheath 105, formation region 104, or any combination of these.

Sensor system 108 may be further configured to detect the returning reflected or refracted acoustic waves and analyze one or more characteristics of the detected waves. The transducer within sensor system 108 may be configured as a transceiver that generates acoustic signals, such as acoustic pulses, during pulse periods, and receives and translates the returning acoustic echo signals into electrical signals during echo response periods, referred to herein alternatively as echo response phases or echo phases. Sensor system 108 may be further configured using electronics and programmatic processing components to determine material and/or structural characteristics of wellbore 107 by processing characteristics of the acoustic echo waves. To perform a caliper function within wellbore 107, sensor system 108 may compare a time and/or period at or within which the sensor system 108 generated an excitation pulse to a later time/period at/within which sensor system 108 detects a reflection or refraction of the excitation pulse to determine a transmit-to-receive time lapse/difference. In some examples, sensor system 108 is configured to determine profile characteristics of borehole 109 based on the time difference. Alternatively or in addition, sensor system 108 may be configured to determine a location, type, sound velocity, or material of an object in or on wellbore 107 based on the time difference. For example, sensor system 108 may determine that a detected object is a portion of a wall of the wellbore, that the object is located a particular distance from sensor system 108 or logging tool 114, that the object includes a particular material, or any combination of these.

Sensor system 108 includes one or more acoustic receivers configured as single purpose receivers or transceivers to detect reflected or refracted acoustic waves. For example, sensor system 108 may include an array of piezoelectric transducers configured to detect reflected or refracted ultrasonic waves. Sensor system 108 may utilize two or more of the acoustic receivers to detect reflected or refracted acoustic waves from which position and/or material characteristics of a detected object can be determined.

Sensor system 108 is configured to emit acoustic waves that radially propagate through wellbore 107 and reflect or refract from objects within wellbore 107, structural characteristics of the casing 106, and/or structural or material properties within subterranean region 104. The one or more acoustic receivers within sensor system 108 detect the reflections or refractions of the acoustic waves. In some embodiments, acoustic sensor 112 includes two or more ultrasonic receivers positioned in a mutually offset manner to detect the reflection or refraction of the acoustic waves at different times and/or positions. With acoustic sensor 112 configured in this manner, sensor system 108 may determine a characteristic of a downhole object by analyzing different times at which the acoustic receivers detect the reflections or refractions. Sensor system 108 may also or alternatively determine other characteristics of wellbore objects and/or formation properties using any of the techniques, operations, and functions described herein.

As depicted and described in further detail with reference to FIGS. 2-7, acoustic sensor 112 may comprise an ultrasonic transceiver including a piezoelectric transducer and a controller module. The one or more piezoelectric transducers each comprise a piezoelectric material layer and electrodes coupled across a width dimension. During each measurement cycle, the controller applies an excitation pulse to the electrodes to induce an ultrasonic vibration in the piezoelectric material layer. The ultrasonic vibration is mechanically transferred across a front side as sensor transmit pulses that induce via reflection/refraction acoustic echoes that are subsequently detected by the controller during an echo response phase of the measurement cycle. However, self-induced interference with the response detection may be caused by internal acoustic reflections of the excitation pulse within the acoustic sensor.

To minimize or effectively prevent self-induced interference, acoustic sensor 112 further includes a backing material layer attached to the back side of the piezoelectric transducer. The backing material layer comprising acoustic damping material that substantially attenuates acoustic waves and further includes an acoustic reflector. As depicted and described in further detail with reference to FIGS. 2-7, the acoustic reflector is configured in terms of its material composition, contour, and positioning with respect to other acoustic sensor features to minimize or prevent internal reflection interference during the echo response phase of measurement cycles.

Figure 2A:
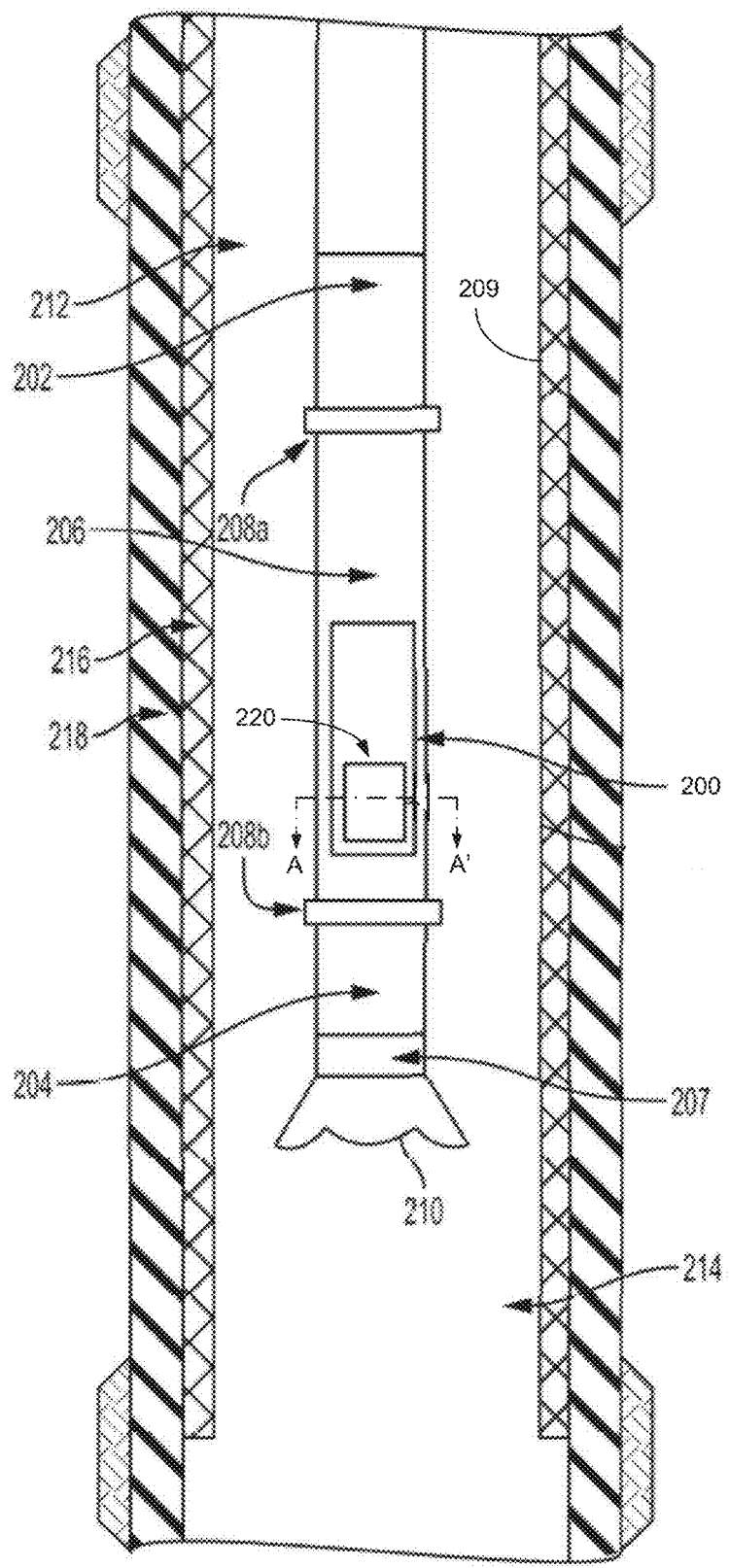
FIG. 2A illustrates a more detailed view of the configuration and deployment of a downhole measurement system that includes a logging tool configured in accordance with some embodiments.
Figure 2B:
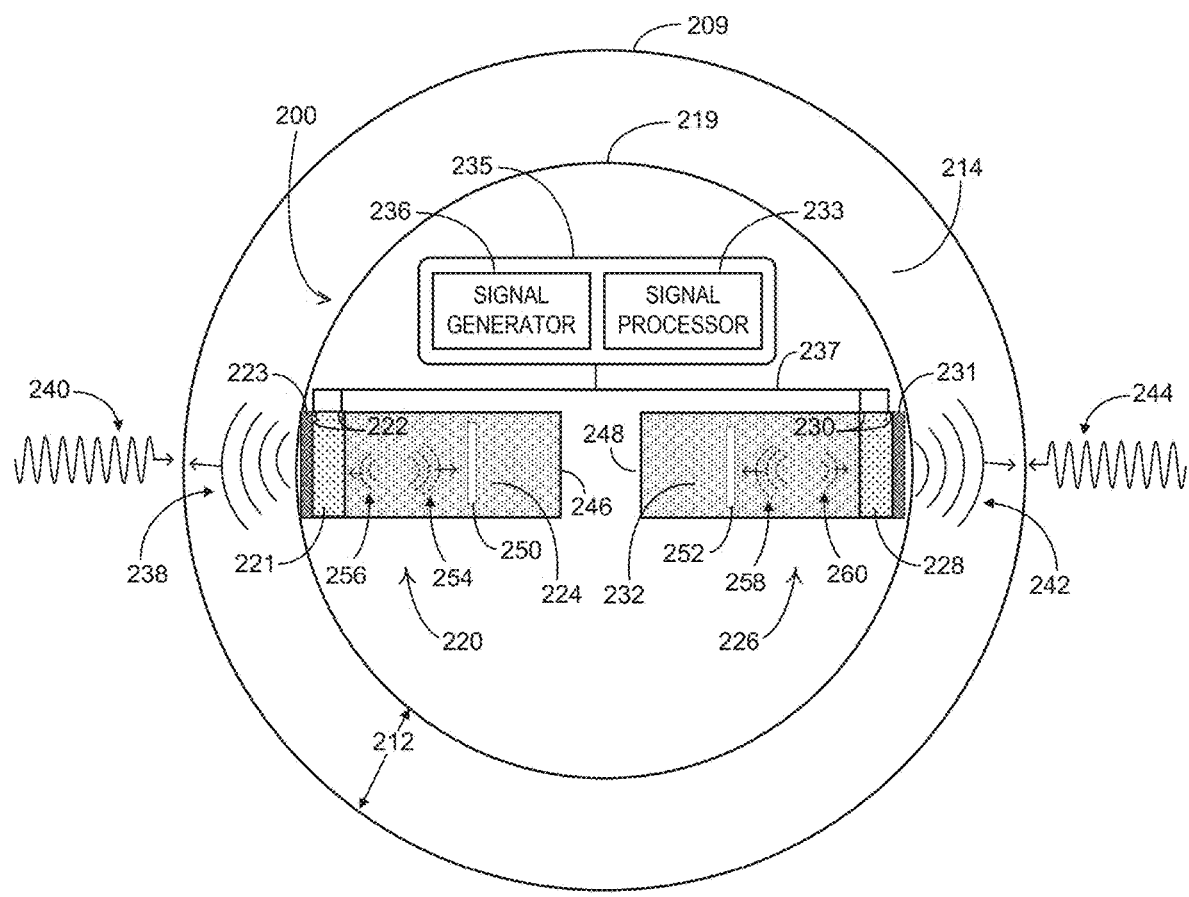
FIG. 2B is an overhead cross-section view depicting transceiver components of the downhole measurement system depicted in FIG. 2A in accordance with some embodiments.

FIGS. 2A and 2B illustrate side and overhead cross-section views of a wellbore environment in which a logging tool 200 is deployed in accordance with some embodiments. The side cross-section view of FIG. 2A shows downhole measurement components that include logging tool 200 deployed as part of a drill string such as may be implemented in a well system such as well system 100. The well system includes a wellbore annulus 212 formed within a casing string 216 that is attached to and surrounded by a cement sheath 218. Fluid 214, which may be drilling mud, may flow within wellbore annulus 212 formed between the drill string components and a wellbore 209 formed by the inner surface lining of casing string 216.

Logging tool 200 may be a logging-while-drilling (LWD) tool, positioned at various points along the length of wellbore 209 as part of the drill string components. The depicted drill string components include various subsystems 202, 204, 206, and 207. For example, subsystem 202 may be a communication subsystem comprising communication and telemetry interface components. Subsystem 204 may be a string saver subsystem or a rotary steerable system. Intermediate subsystem 206 may comprise a tubular section (e.g., a mud motor or measuring-while-drilling module) positioned between subsystems 202 and 204. The drill string further includes a drill bit 210 coupled to the lowermost, distal end of the drill string. A pair of tubular joints 208a and 208b interconnect at least the tubulars surrounding subsystems 202, 204, and 206.

Logging tool 200 may be intermittently or continuously re-positioned by extending and retracting the overall drill string within wellbore 209. Logging tool 200 comprises in part an acoustic sensor 220 that is configured as a piezoelectric transceiver including transmitter and receiver components that may overlap to generate/transmit and receive/process ultrasonic acoustic wave signals. The ultrasonic waves propagate through a pressure-sensitive medium, such as fluid 214 and reflect from one or more surfaces and inter-layer interfaces within, at, and/or beyond wellbore 209. The ultrasonic waves are generated and detected by one or more piezoelectric transducers within acoustic sensor 220. Acoustic signal processing components within logging tool 200 are configured to determine one or more characteristics of materials and objects within and at wellbore 209 as well as formation material properties based on the reflected acoustic waves.

FIG. 2B is an overhead cross-section view depicting components of the downhole measurement system including logging tool 200 in accordance with some embodiments. Logging tool 200 includes acoustic source/transmitter components and acoustic detector and processing components disposed within a tool housing 219. The acoustic transmitter and detector components comprise a pair of acoustic sensors 220 and 226 that are each configured to include a respective piezoelectric transducer for generating and detecting acoustic signals. The transducer within acoustic sensor 220 comprises a piezoelectric material layer 221 and a pair of electrodes 222 coupled across a front side and a back side of piezoelectric material layer 221. The transducer within acoustic sensor 226 comprises a piezoelectric material layer 228 and a pair of electrodes 230 coupled across a front side and a back side of piezoelectric material layer 228.

The transmit and detect components of logging tool 200 further include a sensor controller 235 that is electrically and otherwise communicatively coupled with the transducers of each of acoustic sensors 220 and 226. Sensor controller 235 is configured, using electronics and program code instructions and data to generate and apply excitation pulse signals to each of the respective sets of electrodes 222 and 230 during excitation pulse periods/phases of each measurement cycle. For instance, sensor controller 235 includes a signal generator 236 that is configured using a combination of hardware and/or program code constructs to generate and send the excitation pulse signals to electrodes 222 and 230 via a signal interface 237 that may comprise one or more electrical conduction paths.

Signal generator 236 generates pulse signals comprising alternating current signals and corresponding voltage fluctuations that are applied to electrodes 222 and 230, resulting in fluctuating electrical fields and corresponding fluctuating electrical charges applied across the piezoelectric layers 221 and 228 of each of the transducers. Piezoelectric effect results in changes to mechanical stress and consequent mechanical deformation of piezoelectric material layers 221 and 228. The mechanical deformation corresponds in terms of frequency and amplitude to the frequency and amplitude of the incoming electrical excitations signals, resulting in an ultrasonic vibration of piezoelectric layers 221 and 228. The ultrasonic vibration of the piezoelectric layers 221 and 228 mechanically induces a corresponding ultrasonic pressure wave in fluid medium 214 embodied as transmit pulses 238 and 242 that propagate through wellbore annulus 212. Transmit pulses 238 and 242 induce corresponding acoustic echo signals 240 and 244 that result from reflection and/or refraction from various downhole acoustic boundaries.

Transmit pulses 238 and 242 are generated periodically, intermittently, or otherwise as part of individual measurement cycles in which signal generator 236 and signal processor 233 operate. Each measurement cycle begins with an excitation phase during which signal generator 236 applies an electrical excitation that induces the sensor transmit pulses in the transducers. Each measurement cycle further includes an echo response phase such as may be defined and implemented by signal processor components 233. During the echo response phase of each measurement cycle, signal processor components 233 detect and process acoustic echo responses 240 and 244 induced by the excitation pulses 238 and 242.

Acoustic sensors 220 and 226 further include protective cover layers 223 and 231, respectively, coupled to the radially outward front sides of each of the transducers. Each of cover layers 223 and 231 form a fluid impermeable seal preventing fluids from contacting the internal components of acoustic sensors 220 and 226. In some embodiments, cover layers 223 and 231 may form part of the external surface boundary of tool housing 219. To minimize front side external acoustic reflection during excitation phases and internal acoustic reflection during response phases, cover layers 223 and 231 comprise material having an acoustic impedance matching the acoustic impedance of the external acoustic medium, such as drilling fluids.

In addition to generating the radially outward transmitted excitation pulses, the ultrasonic piezoelectric vibrations induce back side acoustic waves that may result in internal, self-induced sensor interference. For example, the excitation input that generates sensor pulses 238 and 242 simultaneously generates back side acoustic signals 254 and 258, respectively, that when reflected back into the source transducer may induce reverberation interference. To mitigate self-induced reverberation interference, acoustic sensors 220 and 226 further comprise respective backing material layers 224 and 232 attached to the back side of the respective transducer. The backing material comprises acoustic damping material such as ultrasonic attenuation material that is compositionally and structurally configured to attenuate acoustic waves emitted from the back side of the transducer. Backing material layers 224 and 232 comprises blocks of acoustic damping material such as tungsten rubber that attenuate acoustic wave energy including from back side signals 254 and 258. Back side waves 254 and 258 propagate from the respective transducers and into backing material layers 224 and 232 and are at least partially attenuated.

Self-induced interference may be caused by reflections of back side acoustic waves from the ends or back sides 246 and 248 of each of the backing material layers 224 and 232. The signal component characteristics such as frequency of the back side waves 254 and 258 may largely align with corresponding components of echo response signals 240 and 244. Portions of back side waves 254 and 258 may be reflected from back sides 246 and 248 as well as other acoustic boundaries at the edges of backing material layers 224 and 232. Example reflected portions are depicted as reflected backside waves 256 and 260. If received within the same or overlapping time window as the response phase of the sensor measurement cycles, the reflected portions of back side wave 254 and 258 induce reverberations in the piezoelectric layers that substantially reduce SNR for each measurement cycle.

To further mitigate self-induced reverberation interference, acoustic sensors 220 and 226 further comprise acoustic reflectors 250 and 252, respectively. Each of acoustic reflectors 250 and 252 is a material layer comprising a gaseous or liquid fluid, a solid, or a vacuum disposed within backing material layers 224 and 232, respectively. In terms of material composition, individual structural contour, and position within a respective backing material layer, each of acoustic reflectors 250 and 252 is configured to reflect a substantial portion of the acoustic energy of back side waves 254 and 258. To form an effective acoustic reflection boundary, each of acoustic reflectors 250 and 252 comprises a layer within the respective backing material layer having a substantially different acoustic impedance than an acoustic impedance of the backing material layer. For example, acoustic reflectors 250 and 252 may comprise thin gaseous layers within backing material layers 224 and 232 that may comprise tungsten rubber. The gaseous layers are formed as contoured cavities or voids occupied by ambient gases or possibly injected with a selected gas or liquid.

In terms of structural contour, each of acoustic reflectors 250 and 252 may comprise substantially planar components. For instance, acoustic reflectors 250 and 252 may comprise plate-like or disk-like material layers that are axially aligned with the opposing planar front ends of backing material layers 224 and 232. Acoustic waves generated from the back sides of piezoelectric material layers 224 and 232 will attenuate while propagating through the backing material until reaching and being reflected at least in part by the front sides of acoustic reflectors 250 and 252. The reflected back side waves 256 and 260 are further attenuated via additional propagation through the backing material toward piezoelectric material layers 221 and 228.

The distance of reflection is the approximate offset distance between the back sides of piezoelectric material layers 221 and 228 and the opposing front sides of acoustic reflectors 250 and 252. The offset distance is based, at least in part, on the timing of an echo response phase within each of the acoustic sensor measurement cycles. The reflection offset distance is determined and implemented in design such that ultrasonic acoustic wave components of reflected back side waves such as reflected waves 256 and 260 do not coincide with echo signals 240 and 244 within piezoelectric material layers 224 and 232 during the echo response phase of signal processor 233. More specifically, the offset distance is large enough for significant acoustic attenuation/damping of the back side waves and back side wave reflections but small enough such that back side waves reflected from acoustic reflectors 250 and 252 arrive at piezoelectric material layers 224 and 232 prior to an echo response phase of the measurement cycle that generated the back side waves. The reflector offset distance therefore depends, at least in part, on acoustic transmission properties of backing material layers 224 and 232 in combination with the time offset between the excitation pulse of each measurement cycle and the corresponding subsequent echo response phase.

Signal processor 233 executes signal detection functions during echo response phases that follow excitation pulse phases for each measurement cycle. Acoustic reflectors 250 and 252 are positioned with the depicted offset such that a substantial portion of the back side wave energy is reflected back to and reaches the piezoelectric layers 221 and 228 prior to the beginning of the echo response phase. However, excessive energy reflection in the short period between a measurement cycle excitation pulse and subsequent echo response phase may result in large reverberations that induce excessive signal response channel noise that may interfere with overall signal response. Therefore, and as depicted in FIG. 2B, the reflection boundaries presented by acoustic reflectors 250 and 252 may be less in terms of surface area than the opposing back sides of piezoelectric material layers 221 and 228. In this manner, some of the acoustic energy of back side waves 254 and 258 may be reflected while some of it will pass through to the back sides 246 and 248.

The portion of acoustic energy not reflected and therefore propagating past acoustic reflectors 250 and 252 is further attenuated and dispersed within the back end of the backing material layers 224 and 232. For example, a significant amount of non-reflected acoustic energy of back side waves 254 and 258 may be absorbed/consumed via attenuation through the backing material as the initially non-reflected components reflect from back sides 246 and 248 and propagate toward the reflectors 250 and 252 where they are further reflected. To enable the dual reflection and energy absorption function, acoustic reflectors 250 and 252 are configured such that the planar reflective surface area of each is between 15% and 85% of a surface area of the back side of the respective piezoelectric material layer.

Figure 3A:
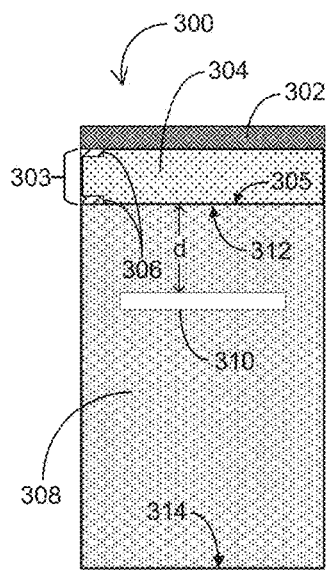
FIG. 3A illustrates a cross-section view of a piezoelectric acoustic sensor that includes an acoustic reflector embedded within a backing material layer in accordance with some embodiments.

As depicted and described with reference to FIGS. 3-7, different acoustic reflector configurations may be utilized depending on the application and the operational context. FIG. 3A illustrates a cross-section view of a piezoelectric acoustic sensor 300 that includes a reflector component embedded within a backing material layer in accordance with some embodiments. At a sensor front side from which acoustic pulses are transmitted, acoustic sensor 300 includes a cover layer 302 attached to a front side of a piezoelectric transducer 303. Cover layer 302 is configured to implement a protection function by providing a fluid impermeable barrier as well as an impedance matching function. Cover layer 302 may comprise, in part, an epoxy resin material having an intermediate acoustic impedance relative to the high acoustic impedance of piezoelectric crystal material and the low acoustic impedance of a wellbore environment that typically comprises a combination of drilling fluid and water. In some embodiments, cover layer 302 may comprise material having an acoustic impedance that substantially matches an acoustic impedance of a downhole fluid environment that provides the external acoustic medium through which the acoustic pulses are transmitted.

Piezoelectric transducer 303 comprises a piezoelectric layer 304 and a pair of electrodes 306 coupled across a width dimension of piezoelectric layer 304. Piezoelectric layer 304 comprises a piezoelectric crystal and/or ceramic material or combination of such materials. Attached to a back side 305 of piezoelectric layer 304 is a backing layer 308 comprising acoustic damping material such as tungsten rubber. Backing layer 308 is depicted as a block component having a front side 312 attached to or otherwise contacting the back side 305 of piezoelectric layer 304. Back side waves generated during an excitation pulse phase propagate from the back side 305 of piezoelectric layer 304 into backing layer 308 toward a back side 314 of backing layer 308.

Acoustic sensor 300 further includes an acoustic reflector 310 disposed between front side 312 and back side 314 of backing layer 308. In the depicted embodiment, acoustic reflector 310 comprises a substantially planar component that is disposed in parallel with the opposing surface plane of the back side 305 of piezoelectric layer 304. Furthermore, as shown, the outer edges of acoustic reflector 310 does not extend as broadly as the back surface of piezoelectric layer 304. For example, acoustic reflector 310 may form a planar reflective surface area that is between 20% and 80% of the total surface area of the back side of piezoelectric layer 304. Acoustic reflector 310 is offset from the back side 305 of the piezoelectric layer by an offset distance, d, that is based, at least in part, on an echo response phase of an acoustic measurement cycle. For example, d may be a distance such that, in accordance with the acoustic transmission properties of the backing material, a reflected back side wave will reach piezoelectric layer 304 prior to an echo response phase for a same measurement cycle.

Figure 3B:
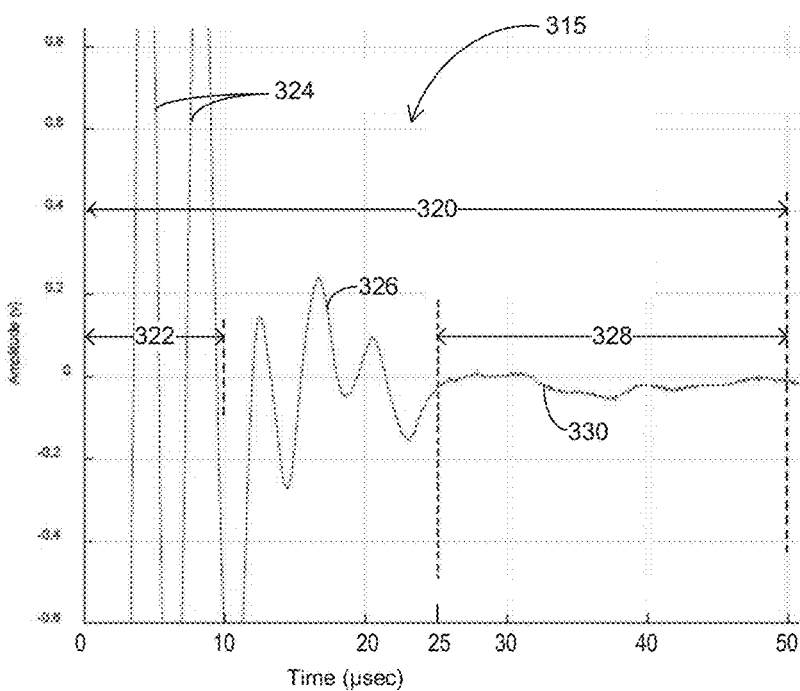
FIG. 3B depicts an acoustic signal profile for the acoustic sensor in FIG. 3A, showing the effect of the acoustic reflector on the amplitude and amplitude variation of acoustic reflections from backing material during an acoustic measurement cycle.

Acoustic sensor control components such as signal generator and signal processor components depicted and/or described with reference to FIGS. 1, 2A, and 2B may be coupled to electrodes 306 to implement measurement cycle operations. FIG. 3B depicts an acoustic signal profile 315 for acoustic sensor 300, showing the effect of the acoustic reflector 310 on the amplitude and amplitude variation of an acoustic reflection from backing layer 308 during an acoustic measurement cycle 320. Measurement cycle 320 begins with application of an electrical excitation pulse 324 to electrodes 306 during an excitation phase 322 that is depicted as spanning from zero to ten microseconds. Following excitation, post-excitation reverberation of piezoelectric layer 304 as well as reflections of the back side acoustic waves by acoustic reflector 310 induces a reverberation signal 326 in electrodes 306 during an intermediate period between excitation phase 322 and an echo response phase 328. The echo response phase 328 is depicted as spanning a 15 microsecond window beginning at approximately 25 microseconds from initial excitation and ending at approximately 50 microseconds from initial excitation. It should be noted that echo response phase 328 may extend beyond 50 microseconds such as up to and possibly beyond 80 microseconds from initial excitation. During echo response phase 328, the sensor signal detection components actively detect and process a response signal 330 in which the amplitude of internal reflection components are minimized as depicted.

Figure 3C:
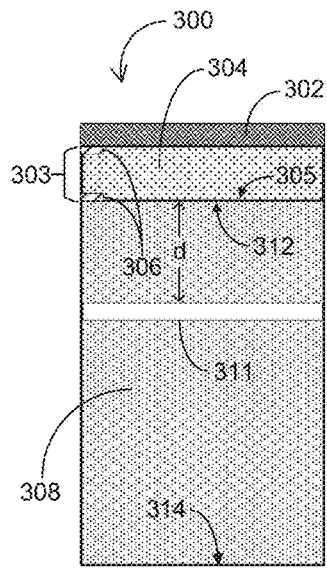
FIG. 3C illustrates a cross-section view of a piezoelectric acoustic sensor that includes an acoustic reflector that provides full reflection of back side acoustic waves within a backing material layer.

FIG. 3C illustrates a cross-section view of piezoelectric acoustic sensor 300 that is reconfigured to include an acoustic reflector 311 that provides full reflection of back side acoustic waves within backing layer 308. As with acoustic reflector 310, acoustic reflector 311 is a substantially planar component disposed between front side 312 and back side 314 of backing layer 308 and offset from the back side 305 of the piezoelectric layer by a distance, d, that is based, at least in part, on an echo response phase of an acoustic measurement cycle. In contrast to acoustic reflector 310, acoustic reflector 311 forms a planar surface that covers all or substantially all of the surface area of the back side of piezoelectric layer 304.

Figure 3D:
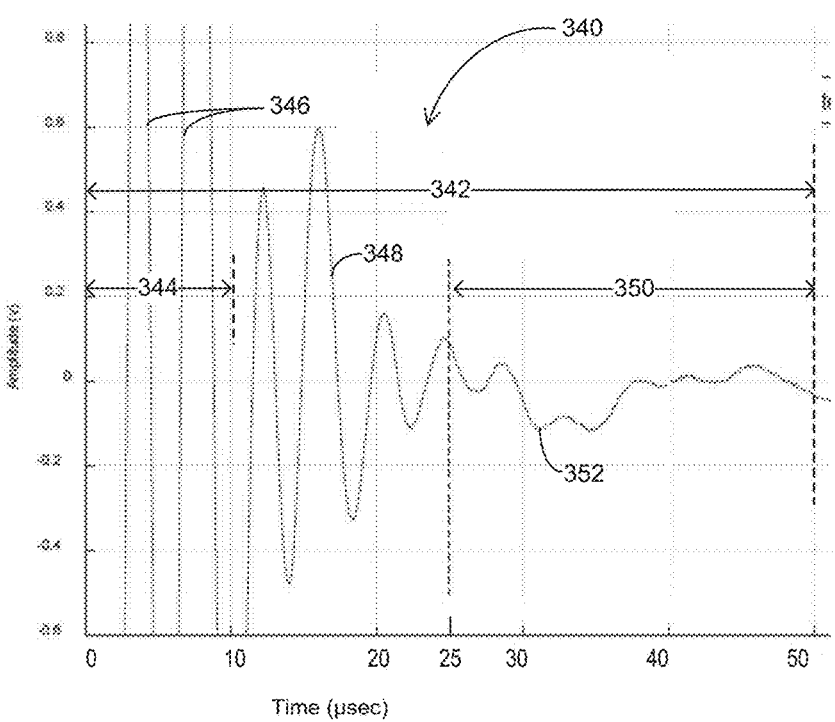
FIG. 3D depicts an acoustic signal profile for the acoustic sensor in FIG. 3C, showing the effect of the full reflection configuration on the amplitude and amplitude variation of acoustic reflections from backing material during an acoustic measurement cycle.

FIG. 3D depicts an acoustic signal profile 340 for the reconfigured acoustic sensor 300 in FIG. 3C, showing the negative effect of the full reflection configuration on the amplitude and amplitude variation of acoustic reflections from backing material during an acoustic measurement cycle 342. Measurement cycle 342 begins with application of an electrical excitation pulse 336 during an excitation phase 344 spanning from zero to ten microseconds. Following excitation, post-excitation reverberation of piezoelectric layer 304 as well as the very strong reflections of the back side acoustic waves by acoustic reflector 311 induces a correspondingly strong and persistent reverberation signal 326 during and extending beyond the intermediate period between excitation phase 344 and an echo response phase 350 The echo response phase 350 spans a 15 microsecond window beginning at approximately 25 microseconds from initial excitation and ending at approximately 50 microseconds from initial excitation. During echo response phase 350, the sensor signal detection components actively detect and process a response signal 352 that as shown includes substantial internal reflection interference.

Figure 4A:
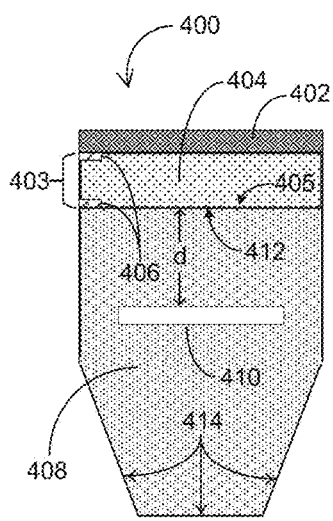
FIG. 4A illustrates a cross-section view of a piezoelectric acoustic sensor that includes an acoustic reflector embedded within a backing material layer in accordance with some embodiments.

FIG. 4A illustrates a cross-section view of an acoustic sensor 400 that includes a reflector component embedded within a backing material layer having a frustum-contour back side in accordance with some embodiments. Similar to sensor 300, acoustic sensor 400 includes a front side cover layer 402 attached to a front side of a piezoelectric transducer 403 that comprises a pair of electrodes 406 coupled across a piezoelectric layer 404. Attached to a back side 405 of piezoelectric layer 404 is a backing layer 408 comprising acoustic damping material such as tungsten rubber. Backing layer 408 is depicted as a six-sided block component having a front side 412 attached to or otherwise contacting the back side 405 of piezoelectric layer 404. Back side waves generated during an excitation pulse phase propagate from the back side 405 of the piezoelectric layer 404 into backing layer 408 toward a frustum-contoured back side 414 of backing layer 408.

An acoustic reflector 410 comprises a substantially planar component disposed between front side 412 and frustum-contoured back side 414. Similar to acoustic reflector 310 in FIG. 3A, acoustic reflector 410 is disposed in parallel with and does not extend as broadly as the back surface of piezoelectric layer 304. For example, acoustic reflector 410 may form a planar reflective surface area that is between 20% and 80% of the total surface area of the back side of piezoelectric layer 404. Acoustic reflector 410 is offset from the back side 305 of the piezoelectric layer by an offset distance, d, that is based, at least in part, on an echo response phase of an acoustic measurement cycle. For example, d may be a distance such that, in accordance with the acoustic transmission properties of the backing material, a reflected back side wave will reach piezoelectric layer 404 prior to an echo response phase for a same measurement cycle.

Figure 4B:
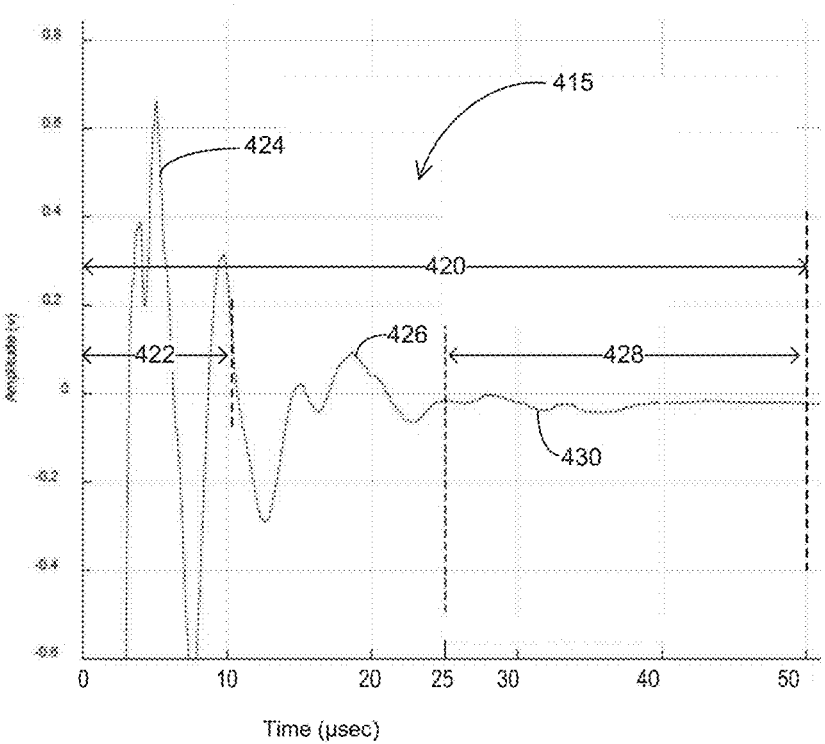
FIG. 4B depicts an acoustic signal profile for the acoustic sensor in FIG. 4A, showing the effect of the acoustic reflector on the amplitude and amplitude variation of acoustic reflections from backing material during an acoustic measurement cycle.

Acoustic sensor control components such as signal generator and signal processor components such as depicted and/or described with reference to FIGS. 1, 2A, and 2B may be coupled to electrodes 406 to implement measurement cycle operations. FIG. 4B illustrates an acoustic signal profile 415 for acoustic sensor 400, showing the effect of the acoustic reflector 310 in combination with the frustum-contouring of back side 414 on the amplitude and amplitude variation of an acoustic reflections during an acoustic measurement cycle 420. Measurement cycle 420 begins with application of an electrical excitation pulse 424 to electrodes 406 during an excitation phase 422 that spans from zero to ten microseconds. Following excitation, post-excitation reverberation of piezoelectric layer 404 as well as reflections of the back side acoustic waves by acoustic reflector 410 induces a reverberation signal 426 during an intermediate period between excitation phase 422 and an echo response phase 428. The echo response phase 428 spans a 15 microsecond window beginning at approximately 25 microseconds from initial excitation and ending at approximately 50 microseconds from initial excitation. It should be noted that echo response phase 428 may extend beyond 50 microseconds such as up to and possibly beyond 80 microseconds from initial excitation. During echo response phase 428, the sensor signal detection components actively detect and process a response signal 430 in which the amplitude of internal reflection components are minimized as depicted.

Figure 5:
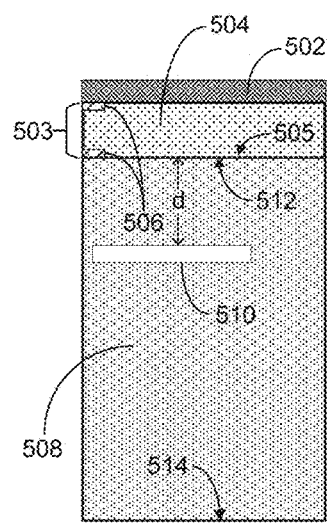
FIG. 5 illustrates a cross-section view of a piezoelectric acoustic sensor that includes an acoustic reflector embedded within a backing material layer in accordance with some embodiments.
Figure 6:
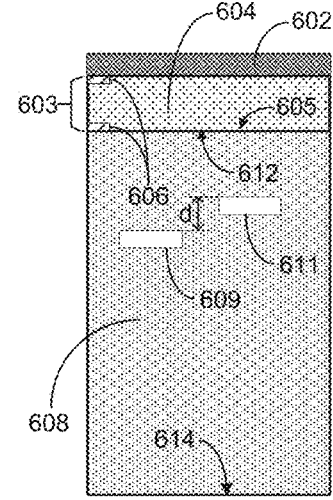
FIG. 6 depicts a cross-section view of a piezoelectric acoustic sensor that includes an acoustic reflector embedded within a backing material layer in accordance with some embodiments.
Figure 7:
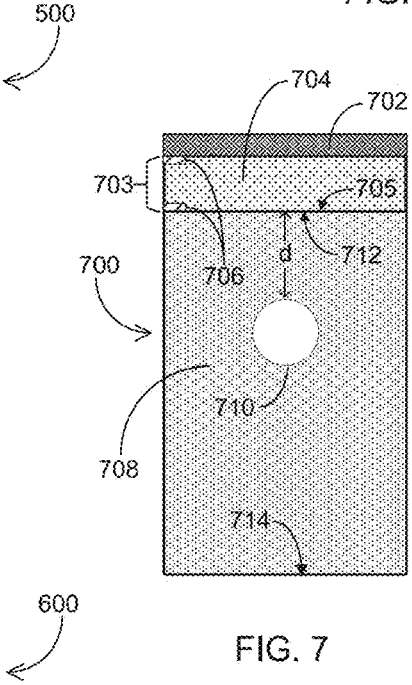
FIG. 7 illustrates a cross-section view of a piezoelectric acoustic sensor that includes a reflector component embedded within a backing material layer in accordance with some embodiments.

As illustrated in FIGS. 5-7, some embodiments may include variations to the contouring, the shape, and the numbers of acoustic reflector disposed in a piezoelectric acoustic sensor. FIG. 5 illustrates a cross-section view of an acoustic sensor 500 in which an off centered reflector component is embedded within a backing material layer in accordance with some embodiments. Acoustic sensor 500 includes a front side cover layer 502 attached to a front side of a piezoelectric transducer 503 that comprises a pair of electrodes 506 coupled across a piezoelectric layer 504. Attached to a back side 505 of piezoelectric layer 504 is a backing layer 508 comprising acoustic damping material such as tungsten rubber. Backing layer 508 is depicted as a block component having a front side 512 attached to or otherwise contacting the back side 505 of piezoelectric layer 504. Back side waves generated during an excitation pulse phase propagate from the back side 505 of the piezoelectric layer 504 into backing layer 508 toward a back side 514 of backing layer 508.

An acoustic reflector 510 comprises a substantially planar component disposed between front side 512 and back side 514. Similar to acoustic reflectors 310 and 410, acoustic reflector 510 does not extend as broadly as the back surface of piezoelectric layer 504. For example, acoustic reflector 510 may form a planar reflective surface area that is between 20% and 80% of the total surface area of the back side of piezoelectric layer 504. In contrast to the embodiments depicted in FIGS. 3A and 4A, acoustic reflector 510 is off centered with respect to the back side surface of piezoelectric layer 504. Acoustic reflector 510 is offset from the back side 505 of the piezoelectric layer by an offset distance, d, that is based, at least in part, on an echo response phase of an acoustic measurement cycle. For example, d may be a distance such that, in accordance with the acoustic transmission properties of the backing material, a reflected back side wave will reach piezoelectric layer 504 prior to an echo response phase for a same measurement cycle.

FIG. 6 illustrates a cross-section view of an acoustic sensor 600 in which multiple, and specifically two, reflector components are embedded within a backing material layer in accordance with some embodiments. Acoustic sensor 600 includes a front side cover layer 602 attached to a front side of a piezoelectric transducer 603 that comprises a pair of electrodes 606 coupled across a piezoelectric layer 604. Attached to a back side 605 of piezoelectric layer 604 is a backing layer 608 comprising acoustic damping material such as tungsten rubber. Backing layer 608 is depicted as a block component having a front side 612 attached to or otherwise contacting the back side 605 of piezoelectric layer 604. Back side waves generated during an excitation pulse phase propagate from the back side 605 of piezoelectric layer 604 into backing layer 608 toward a back side 614 of backing layer 608.

Acoustic sensor 600 further includes a pair of acoustic reflectors 609 and 611, each comprising a substantially planar component disposed between front side 612 and back side 614 and mutually offset axially by a distance, d. Acoustic reflectors 609 and 611 are also laterally offset such that a gap exists between the reflectors as well as around the outer edges of the reflectors. In this manner the combined surface areas of acoustic reflectors 609 and 611 are less than the surface area of the back surface of piezoelectric layer 604. Each of the distances that acoustic reflectors 609 and 611 are offset from the back side 605 of the piezoelectric layer are based, at least in part, on an echo response phase of an acoustic measurement cycle. For example, one or both of acoustic reflectors 609 and 611 may be offset by distances such that, in accordance with the acoustic transmission properties of the backing material, a reflected back side wave will reach piezoelectric layer 604 prior to an echo response phase for a same measurement cycle.

FIG. 7 depicts a cross-section view of an acoustic sensor 700 in which a curve-contoured reflector component is embedded within a backing material layer in accordance with some embodiments. Acoustic sensor 700 includes a front side cover layer 702 attached to a front side of a piezoelectric transducer 703 that comprises a pair of electrodes 706 coupled across a piezoelectric layer 704. Attached to a back side 705 of piezoelectric layer 704 is a backing layer 708 comprising acoustic damping material such as tungsten rubber. Backing layer 708 is depicted as a block component having a front side 712 attached to or otherwise contacting the back side 705 of piezoelectric layer 704. Back side waves generated during an excitation pulse phase propagate from the back side 705 of the piezoelectric layer 704 into backing layer 708 toward a back side 714 of backing layer 708.

An acoustic reflector 710 comprises a substantially spherical or cylindrical component disposed between front side 712 and back side 714. Similar to acoustic reflectors 310, 410, and 510 the reflective surface of acoustic reflector 710 does not extend as broadly as the back surface of piezoelectric layer 704. For example, acoustic reflector 710 may form a semi-circular reflective surface area that is between 20% and 80% of the total surface area of the back side of piezoelectric layer 704. The curved, in this case semi-circular, reflective surface imparts additional acoustic energy dispersion to further attenuate back side acoustic waves prior to a measurement cycle echo response phase. In addition, acoustic reflector 710 is offset from the back side 705 of the piezoelectric layer by an offset distance, d, that is based, at least in part, on an echo response phase of an acoustic measurement cycle. For example, d may be a distance such that, in accordance with the acoustic transmission properties of the backing material, a reflected back side wave will reach piezoelectric layer 704 prior to an echo response phase for a same measurement cycle.

Figure 8:
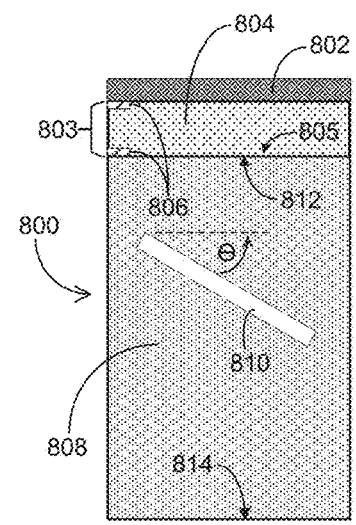
FIG. 8 depicts a cross-section view of a piezoelectric acoustic sensor that includes a reflector component embedded within a backing material layer in accordance with some embodiments.

FIG. 8 depicts a cross-section view of an acoustic sensor 800 in which a planar reflector component is disposed within a backing material layer at an angular offset with respect to a piezoelectric layer. Acoustic sensor 800 includes a front side cover layer 802 attached to a front side of a piezoelectric transducer 803 that comprises a pair of electrodes 806 coupled across a piezoelectric layer 804. Attached to a back side 805 of piezoelectric layer 804 is a backing layer 808 comprising acoustic damping material such as tungsten rubber. Backing layer 808 is depicted as a block component having a front side 812 attached to or otherwise contacting the back side 805 of piezoelectric layer 804. Back side waves generated during an excitation pulse phase propagate from the back side 805 of the piezoelectric layer 804 into backing layer 808 toward a back side 814 of backing layer 808.

An acoustic reflector 810 comprises a substantially planar component disposed between front side 812 and back side 814 at an offset angle, θ, with respect to the plane formed at the back surface of piezoelectric layer 804. In some embodiments, the offset angle may be a fixed angle between 25° and 60°. Angled in the depicted manner, a parallel component 813 of the reflective surface of acoustic reflector 810 does not extend as broadly as the back surface of piezoelectric layer 804. For example, the surface area dimensions in terms of length, width, radius, for example, in combination with offset angle θ result in the area covered across parallel component forming an effective reflective surface area that is between 20% and 80% of the total surface area of the back side of piezoelectric layer 804. The substantially angled reflective surface imparts additional acoustic energy dispersion to further attenuate back side acoustic waves prior to a measurement cycle echo response phase.

It should be noted that while multiple variations in terms of the material composition, contouring, and positioning of the acoustic reflectors are depicted in particular combinations in each of FIGS. 3A, 4A, 5, 6, 7, and 8, potential embodiments are not limited to these particular combinations. For instance, the curved contour of acoustic reflector 710 in FIG. 7 may be combined with the multiple acoustic reflector feature shown in FIG. 6. Other combinations across the depicted embodiments are possible.

Example Embodiments

Embodiment 1: an acoustic sensor comprising: a transducer including a piezoelectric material layer having a front side from which the transducer is configured to transmit acoustic sensing signals and an opposing back side; a backing material layer comprising an acoustic damping material and having a front side coupled to the back side of the piezoelectric material layer; and an acoustic reflector comprising a fluid and disposed between the front side and a back side of the backing material layer. For Embodiment 1, the acoustic reflector may comprise a cavity within the backing material layer that contains a gaseous or a liquid fluid. For Embodiment 1, the acoustic reflector may be offset from the back side of the piezoelectric material layer by an offset distance that is based, at least in part, on an echo response phase of an acoustic measurement cycle. The offset distance may be based, at least in part, on a start of the echo response phase within the acoustic measurement cycle. The offset distance may be based, at least in part, on an acoustic impedance of the backing material and the echo response phase. For Embodiment 1, the acoustic reflector may comprise a planar reflective surface having a smaller surface area than a surface area of the back side of the piezoelectric material layer. For Embodiment 1, the back side of the backing material layer may be frustum contoured. For Embodiment 1, the acoustic reflector may comprise a first planar component and a second planar component, wherein the first planar component is axially and laterally offset from the second planar component. For Embodiment 1, the acoustic reflector may comprise a curved convex outer surface contour. For Embodiment 1, the acoustic reflector may comprise a planar component that is disposed within the backing material layer at an offset angle relative to the backside of the transducer, wherein the offset angle is between 25 and 60 degrees. For Embodiment 1, the acoustic sensor may further comprise a cover layer coupled to the front side of the piezoelectric material layer and forming a sealed boundary between an external acoustic medium and said transducer, wherein said cover layer comprises a material having an acoustic impedance substantially matching an acoustic impedance of the external acoustic medium.

Embodiment 2: a downhole sensor apparatus comprising: a transducer including a piezoelectric material layer; a backing material layer comprising acoustic damping material and attached to the transducer; and an acoustic reflector embedded within the backing material layer and comprising a reflective surface opposing a back side of the piezoelectric material layer, wherein the acoustic reflector comprises a material having a different acoustic impedance than an acoustic impedance of the acoustic damping material. For Embodiment 2, wherein the acoustic reflector may comprise a cavity within the backing material layer that contains a gaseous or a liquid fluid. For Embodiment 2, wherein the acoustic reflector may comprise a planar reflective surface having a smaller surface area than a surface area of the back side of the piezoelectric material layer. The planar reflective surface area of the acoustic reflector may be between 15% and 85% of a surface area of the back side of the piezoelectric material layer. For Embodiment 2, the acoustic reflector may be offset from the back side of the piezoelectric material layer by an offset distance that is based, at least in part, on an echo response phase of an acoustic measurement cycle. The offset distance may be based, at least in part, on a start of the echo response phase within the acoustic measurement cycle. The offset distance may be based, at least in part, on an acoustic impedance of the backing material and the echo response phase. For Embodiment 2, the backing material layer may comprise tungsten rubber.

Embodiment 3: a downhole acoustic logging tool comprising: an acoustic sensor comprising, a transducer including a piezoelectric material layer; a backing material layer having a front end coupled to a back side of the piezoelectric material layer, wherein the backing material layer comprises an acoustic damping material; and an acoustic reflection boundary disposed within the backing material layer between the front end of the backing material layer and a back end of the backing material layer, wherein the acoustic reflection boundary comprises a material having a different acoustic impedance than an acoustic impedance of the acoustic damping material, and wherein the acoustic reflection boundary is offset from the back side of the piezoelectric material layer by an offset distance that is based, at least in part, on an echo response phase; and a controller communicatively coupled with the acoustic sensor and configured to detect an acoustic response during the echo response phase.

What is claimed is:

1. An acoustic sensor comprising:
    a transducer including a piezoelectric material layer having a front side from which the transducer is configured to transmit acoustic sensing signals and a back side;
    a backing material layer comprising an acoustic damping material and having a front side coupled to the back side of the piezoelectric material layer; and
    an acoustic reflector comprising a fluid and disposed between the front side and a back side of the backing material layer, wherein the acoustic reflector is offset from the back side of the piezoelectric material layer by an offset distance that is based, at least in part, on a time duration between an excitation pulse of an acoustic measurement cycle and an echo response phase of the acoustic measurement cycle.

2. The acoustic sensor of claim 1, wherein the acoustic reflector comprises a cavity within the backing material layer that contains a gaseous or a liquid fluid.

3. The acoustic sensor of claim 1, further comprising a cover layer coupled to the front side of the piezoelectric material layer and forming a sealed boundary between an external acoustic medium and said transducer, wherein said cover layer comprises a material having an acoustic impedance substantially matching an acoustic impedance of the external acoustic medium.

4. The acoustic sensor of claim 1, wherein the offset distance is based, at least in part, on a start of the echo response phase within the acoustic measurement cycle.

5. The acoustic sensor of claim 1, wherein the offset distance is based, at least in part, on an acoustic impedance of the backing material layer.

6. The acoustic sensor of claim 1, wherein the acoustic reflector comprises a planar reflective surface having a smaller surface area than a surface area of the back side of the piezoelectric material layer.

7. The acoustic sensor of claim 6, wherein the back side of the backing material layer is frustum contoured.

8. The acoustic sensor of claim 1, wherein the acoustic reflector comprises a first planar component and a second planar component, wherein the first planar component is axially and laterally offset from the second planar component.

9. The acoustic sensor of claim 1, wherein the acoustic reflector comprises a curved convex outer surface contour.

10. The acoustic sensor of claim 1, wherein the acoustic reflector comprises a planar component that is disposed within the backing material layer at an offset angle relative to the back side of the transducer, wherein the offset angle is between 25 and 60 degrees.

11. A downhole sensor apparatus comprising:
    a transducer including a piezoelectric material layer;
    a backing material layer comprising acoustic damping material and attached to the transducer; and
    an acoustic reflector embedded within the backing material layer and comprising a reflective surface opposing a back side of the piezoelectric material layer, wherein the acoustic reflector comprises a material having a different acoustic impedance than an acoustic impedance of the acoustic damping material, wherein the acoustic reflector is offset from the back side of the piezoelectric material layer by an offset distance that is based, at least in part, on a time duration between an excitation pulse of an acoustic measurement cycle and an echo response phase of the acoustic measurement cycle.

12. The downhole sensor apparatus of claim 11, wherein the backing material layer comprises tungsten rubber.

13. The downhole sensor apparatus of claim 11, wherein the acoustic reflector comprises a cavity within the backing material layer that contains a gaseous or a liquid fluid.

14. The downhole sensor apparatus of claim 11, wherein the acoustic reflector comprises a planar reflective surface having a surface area that is smaller than a surface area of the back side of the piezoelectric material layer.

15. The downhole sensor apparatus of claim 14, wherein the surface area of the planar reflective surface is between 15% and 85% of the surface area of the back side of the piezoelectric material layer.

16. The downhole sensor apparatus of claim 11, wherein the offset distance is based, at least in part, on an acoustic impedance of the backing material layer.

17. The downhole sensor apparatus of claim 11, wherein the offset distance is based, at least in part, on a start of the echo response phase within the acoustic measurement cycle.

18. A downhole acoustic logging tool comprising:
    an acoustic sensor comprising, a transducer including a piezoelectric material layer;
        a backing material layer having a front end coupled to a back side of the piezoelectric material layer, wherein the backing material layer comprises an acoustic damping material; and an acoustic reflection boundary disposed within the backing material layer between the front end of the backing material layer and a back end of the backing material layer, wherein the acoustic reflection boundary comprises a material having a different acoustic impedance than an acoustic impedance of the acoustic damping material, and wherein the acoustic reflection boundary is offset from the back side of the piezoelectric material layer by an offset distance that is based, at least in part, on a time duration between an excitation pulse of an acoustic measurement cycle and an echo response phase; and a controller communicatively coupled with the acoustic sensor and configured to detect an acoustic response during the echo response phase.

\* \* \* \* \*